United States Patent
Brais et al.

[11] Patent Number: 5,995,936
[45] Date of Patent: Nov. 30, 1999

[54] REPORT GENERATION SYSTEM AND METHOD FOR CAPTURING PROSE, AUDIO, AND VIDEO BY VOICE COMMAND AND AUTOMATICALLY LINKING SOUND AND IMAGE TO FORMATTED TEXT LOCATIONS

[76] Inventors: Louis Brais, 41 Cartwright Rd., Wellesley, Mass. 00281; Colin Brenan, 5 Hines Way, Marblehead, Mass. 01945; Peter Madden, 3290 Cypress Street, Vancouver, British Columbia, Canada, V6J 3N6

[21] Appl. No.: 08/794,950

[22] Filed: Feb. 4, 1997

[51] Int. Cl.⁶ .................................................. G01L 9/00
[52] U.S. Cl. ..................... 704/275; 704/235; 369/25; 707/512
[58] Field of Search ................................ 704/200, 235, 704/251, 270, 275, 276, 278; 707/529, 512; 369/25

[56] References Cited

U.S. PATENT DOCUMENTS

| | | | |
|---|---|---|---|
| 4,764,965 | 8/1988 | Yoshimura et al. | 704/278 |
| 5,231,670 | 7/1993 | Goldhor et al. | 704/275 |
| 5,477,511 | 12/1995 | Englehardt | 369/25 |
| 5,481,645 | 1/1996 | Bertino et al. | 704/270 |
| 5,572,728 | 11/1996 | Tada et al. | 395/616 |
| 5,583,571 | 12/1996 | Friedland | 348/373 |

*Primary Examiner*—David R. Hudspeth
*Assistant Examiner*—Donald L. Storm
*Attorney, Agent, or Firm*—Lacasse & Associates

[57] ABSTRACT

A system and method of automatically assembling voice information and image information into reports or data bases is disclosed. The system uses a microphone connected to a computer for converting spoken words into text and then parses the text to distinguish commands for execution from text information for the report. Commands for image acquisition cause digital images to be inserted within the report or within a database file. Images are associated with text information or with specific locations within the text information. In dependence upon the commands and the associations, a report is automatically generated from prerecorded information.

12 Claims, 11 Drawing Sheets

REPORT GENERATION SYSTEM AND METHOD FOR CAPTURING PROSE, AUDIO, AND VIDEO BY VOICE COMMAND AND AUTOMATICALLY LINKING SOUND AND IMAGE TO FORMATTED TEXT LOCATIONS

FIELD OF THE INVENTION

This invention relates to the field of report generation and more particularly, this invention relates to automated report generation in dependence upon speech to text processing, spoken commands, relative time information, and captured video images or clips.

BACKGROUND OF THE INVENTION

There is an increasing need in many industries for rapid and efficient creation of reports by individuals who travel to a site remote from their normal place of work, record information relating to observations and fabricate a report that contains both text and images and is a written document or an electronic file. Information is gathered at the remote site by taking pictures and/or filming, and writing on a piece of paper or dictating to a tape recorder so the information need not be memorised. Industries which require report generation in this manner include construction and building inspection, utility inspectors, field scientists (geologists, biologists, oceanographers) and insurance agents. The motivation for this method of report generation is that the timeliness of the data contained in a report is significant and its collection, collation and dissemination in a report format is critical to its usefulness. It would also be advantageous to increase productivity of inspectors by limiting time spent assembling and entering reports.

The process for generating a report is particularly burdensome when a large number of reports need to be generated on a regular basis or when a large amount of data is collected over an extensive period of time and then collated into a single large report. Furthermore, efficient and timely management of large amounts of information, typically in either a report format or a database, is critical to the financial success of some businesses.

Currently, report preparation requires several labour-intensive and time-consuming steps that involve integration of text or voice narrative and images into a unified report format. The report format may comprise text, recorded voice, still images, or video images. The report is generated in one of several formats in the form of a printed document, a video, a slide show, or a multi-media presentation.

In the past, reports were generated following a method such as those outlined below. The first step in report generation is acquisition of information. Information acquired for use in report generation comprises images (either still or video) and associated prose describing the images and other observations, stored as writing on paper or stored on audio or video tape.

Images are acquired in several ways. A photographic camera records a scene on photographic film, a video camera records audio and visual information on a mass storage device such as magnetic tape, and a digital camera records an image on a digital storage device such as a random access memory. These image capture means are well known to those of skill in the art.

Integration of the images into a report is presently achieved using several different methods each having multiple steps. A very time-inefficient method, which is not necessarily computer-based and which is most applicable when using photographs, is to first develop exposed film into photographs and then manually paste the photographs into appropriate places in a report. This approach is slow, includes many steps that cannot be automated (for example, the film must be removed from the camera and processed, the developed pictures must be manually pasted into the report), and prevents easy retrieval of images by the operator from a computer based archival database short of manually skimming the images—adding yet another step. The increased value added in each step makes the procedure less efficient, less timely, and more expensive—more so when a failure occurs during one of the later steps.

A second method of integrating images into a report comprises the following steps. Exposed film is developed into photographs and the photographs into a digital electronic format with a device such as an optical scanner for input to a computer. Black and white scanners and colour scanners that interface with a computer for the purpose of digitising images are well known. Alternatively, an analogue output of a solid-state or video camera is converted with an analogue-to-digital converter or frame grabber into a digital format of an image for provision to a computer. The use of video image input to computers is well known. One such device, the Connectix® QuickCam® is a consumer product that interfaces with a parallel port on an IBM® PC compatible computer. Digital cameras are also known. In U.S. Pat. No. 5,402,170 to Parulski et al. an example of a hand-manipulated electronic camera coupled with a personal computer is disclosed.

These images are then converted for use with a word-processing application or other report generating software. Alternatively, a user records images onto video tape while observing the images; the user later transfers the images from the video recording to a computer. An operator specifies locations within a report at which the images are to be inserted and pastes the digital images into the report document following the report generating software's instructions.

As with integration of images into a report, integration of textual information into a report is performed using several methods.

According to the prior art, transcription from either hand-written notes or from dictation stored on audio tape is a common technique by which text is provided to a computer. These methods preclude using both hands for performing tasks while making notes. Both methods require that a typist transcribe the information with the inevitable introduction of errors into the transcription. Also, a significant time-delay between a creation of a narrative at an observation site and a time at which a report is finalised occurs.

More recently, speech recognition systems more accurately referred to as speech to text systems have become popular. Currently available systems support vocabularies in excess of 20,000 words and are reliable enough for day to day use. Speech to text hardware and/or software is well known and includes systems such as the IBM Voice Type Dictation System® (IBM®, New York, N.Y.). Using a speech to text system for entering notes frees up both hands, but does not address the issue of report compilation time or effort as a process of report generation remains a multi-step process.

Once in an electronic format the text and images are integrated together in a report format with software known in the prior art. Examples of such software includes Microsoft Word®, Microsoft Powerpoint®, Interleaf® and FrameMaker®.

It would be advantageous to reduce a number of steps required to generate a report. It would also be advantageous to generate a report in a single pass.

It would also be advantageous to generate the report while the inspector is in the field without having to return to the office to generate his/her report.

Object of the Invention

In order to overcome these and other limitations of the prior art it is an object of the present invention to provide a system for automatically compiling a report in dependence upon recorded information and commands.

It is an object of the present invention to provide a system for automatically compiling a report in dependence upon recorded information comprising dictation or text and images.

Summary of the Invention

In accordance with the invention there is provided a method of automatically generating a report performed by an electronic system in dependence upon captured information comprising the steps of: providing prose to an information gathering system; storing the prose in retrievable locations for retrieval; capturing sound and/or image data using a capture means to provide a representation of the sound and/or image; storing the representation of the sound and/or image; while providing prose, associating an identifier with a stored representation and a retrievable location; processing the prose to provide information in a predetermined format; inserting, within the processed information, the representation identified by the identifier at a predetermined location in dependence upon the associated retrievable location; and providing the formatted processed information with the inserted representation to an output means.

In accordance with the invention there is provided a method of automatically generating a report performed by an electronic system in dependence upon captured information comprising the steps of: providing recorded information comprising audio recording information and image recording information to a processor; using a speech to text means, processing the audio recording information to extract commands and to extract information; using a processor, formatting the processed information in dependence upon extracted commands; and, providing the formatted processed information to an output means.

In accordance with the invention there is provided a method of automatically generating a report performed by an electronic system in dependence upon captured information comprising the steps of: providing spoken prose to a speech to text means; converting the spoken prose to electronic text prose and storing the electronic text for retrieval, the electronic text prose stored in retrievable locations; providing spoken commands to a speech to text means; converting the spoken commands to electronic commands; in response to an electronic command, capturing sound and/or image data using a capture means and providing a representation of the sound and/or image to a processor; storing the representation of the sound and/or image in non-volatile storage; in response to an electronic command, associating a representation and a retrievable location within the electronic text prose and an identifier; storing the identifier in non-volatile storage means; using a processor, processing the electronic text prose and providing information in a predetermined format; inserting, within the information in a predetermined format, the representation identified by the stored identifier at a predetermined location in dependence upon the associated retrievable location; and storing the formatted processed information with the inserted representation in non-volatile memory.

In accordance with another aspect of the invention there is provided a system for automatically constructing reports comprising: means for providing prose to an information gathering system; means for storing the prose in retrievable locations for retrieval; capture means for capturing sound and/or image data and for providing a representation of the sound and/or image; means for storing the representation of the sound and/or image; means for associating an identifier with a stored representation and a retrievable location while providing prose; processor means for processing the prose to provide information in a predetermined format and for inserting, within the processed information, the representation identified by the identifier at a predetermined location in dependence upon the associated retrievable location; and means for providing the formatted processed information with the inserted representation to an output means.

An advantage of the present invention is that electronic reports are compiled with a single data gathering step and a fully automated report compilation step.

Another advantage of the present invention, is that data gathering and compilation are organised and directed by a same individual at the time the data is gathered.

Another advantage of the present invention is that it alleviates a need for a data gatherer to return to a office to perform report compilation and dissemination.

Another advantage of the present invention is that it supports electronic data transmission, thereby reducing cycle time from data gathering to report generation and provision to an output means.

Yet another advantage of the present invention is that a portable system for report generation and data gathering that is worn by a user frees the user's hands while the user gathers visual and narrative information for a report.

Yet another advantage of the present invention is the use of a method according to the invention for data archiving and indexing.

BRIEF DESCRIPTION OF THE DRAWINGS

Exemplary embodiments of the present invention will now be described in conjunction with the attached drawings in which.

DETAILED DESCRIPTION

Figure 1:
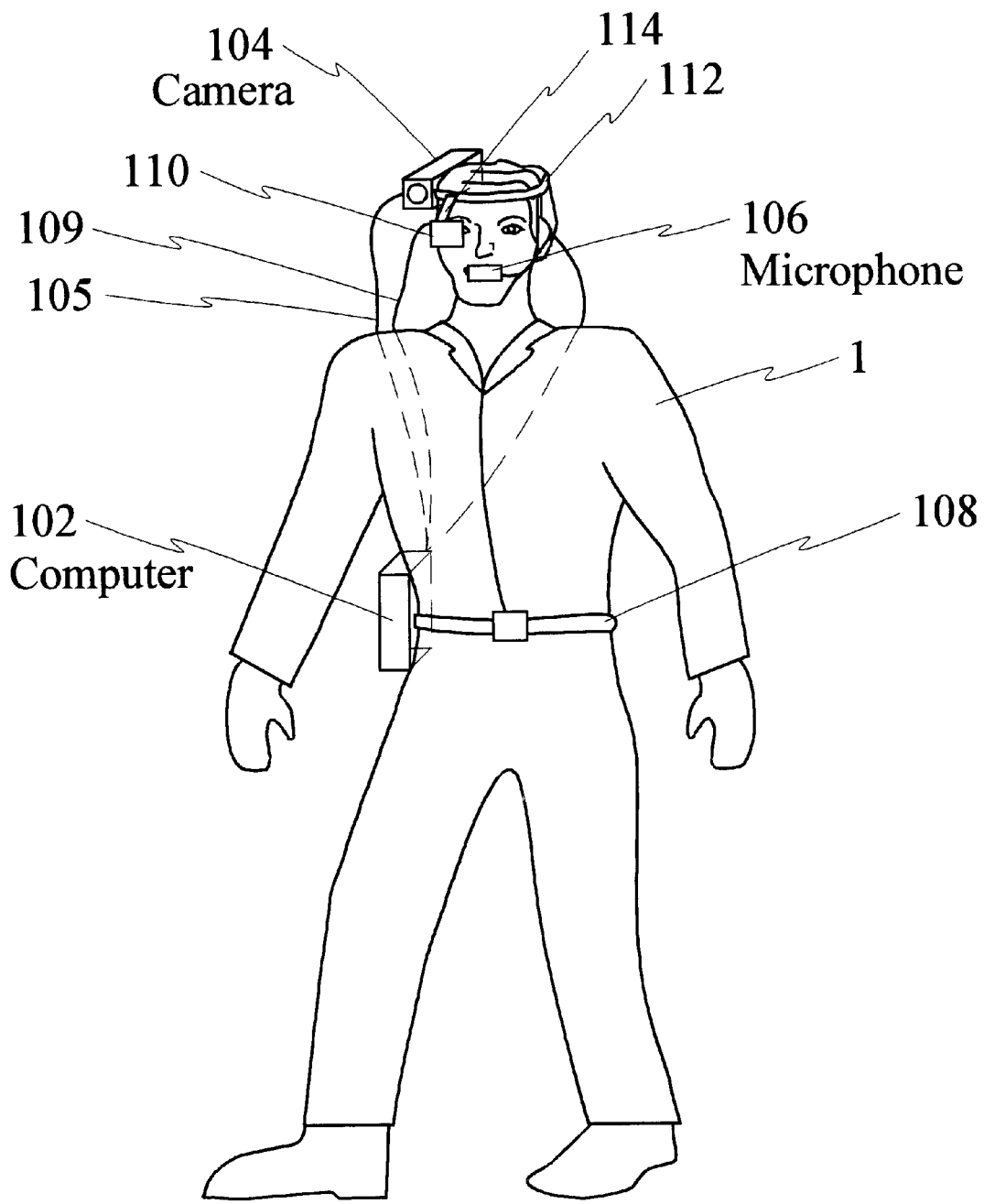
FIG. 1 is a front view of a user wearing a system in accordance with an embodiment of the present invention.

With the reduction in computer size and the ever increasing capacity of computers, portable computers are now small and effective. Advances in digital photography and video camera design have produced electronic cameras of very small size. Herein is disclosed a system comprising a small digital camera, a microphone, a processor and a storage means for automatically generating inspection reports, news reports, evaluation reports, and many other audio/visual reports. The reports comprise prose in the form of text, audio "sound clips," images, "video clips," and other gathered electronic data. The automatic report generation feature disclosed, allows reports to be compiled and generated in dependence upon collected information and format instructions provided during information collection. It eliminates the requirement for an investigator to review, organise, compile, and collate investigation results. In the preferred embodiment, the system allows review and editing of collected information during the collection process in order to increase system flexibility.

An embodiment of an apparatus for carrying out a method according to the invention is also disclosed. The apparatus comprises a plurality of components—a speech recording means for recording speech, a speech to text system for converting speech into text; image capture means for capturing images and converting them into a digital electronic form for storage; storage means for storing the text, the speech and the digital electronic form of images; and a processor means for manipulating the text and digital electronic form of images and speech and for compiling a report in electronic form for provision to an output means.

A method is also disclosed for integrating images captured and speech of an operator or a user using a system according to the present invention into a report or database. The method is comprised of several distinct steps comprising: providing data in the form of voice and image data to a processor, converting some of the voice data in the form of prose into processed prose in the form of text, using a processor formatting the text and images into an electronic report for provision to an output means, and providing the electronic report to an output means.

The method comprises two broad steps. In the first step, a user records data in the form of (a) prose in the form of voice commentary and (b) video and/or still images. The prose and the video and/or still images are digitised, stored in a digital storage means, and provided directly to a speech to text system. The speech to text system converts digitised voice into text. The text is separated into two constituents—prose and commands. Using the speech to text system for prose and command entry in this fashion allows inspectors to format and compile the report while recording the data, allows inspectors to move about while dictating the textual narrative for the report, and allows inspectors to conduct an inspection using both hands while entering data.

In the second broad step, the stored images, the digitised voice, and/or the processed prose in the form of recognised text are integrated automatically into a report or database. In the preferred embodiment, the digitised voice, the recognised text, and the images are combined into one or several computer files that make up one or several reports or databases. The combination of the data is performed in dependence upon commands, either included within the digitised voice, or provided to the processor through other input means. In an embodiment, the text and digitised images are inserted in chronological order into a word processing document and saved as a file. In an embodiment, the text and digitised images are inserted automatically into a slide presentation program such as Microsoft PowerPoint. In yet another embodiment, the text and digitised images are stored within a database wherein images have associated annotations in the form of text, audio clips, or images.

During data recording referred to as dictation mode, prose of an operator in the form of spoken text is converted to text and stored in a file in the computer. The file is then used according to the invention in report generation. In another mode—command mode—spoken commands of an operator in the form of utterances or spoken text are converted to commands for control of computer operations and for processing data.

Figure 2:
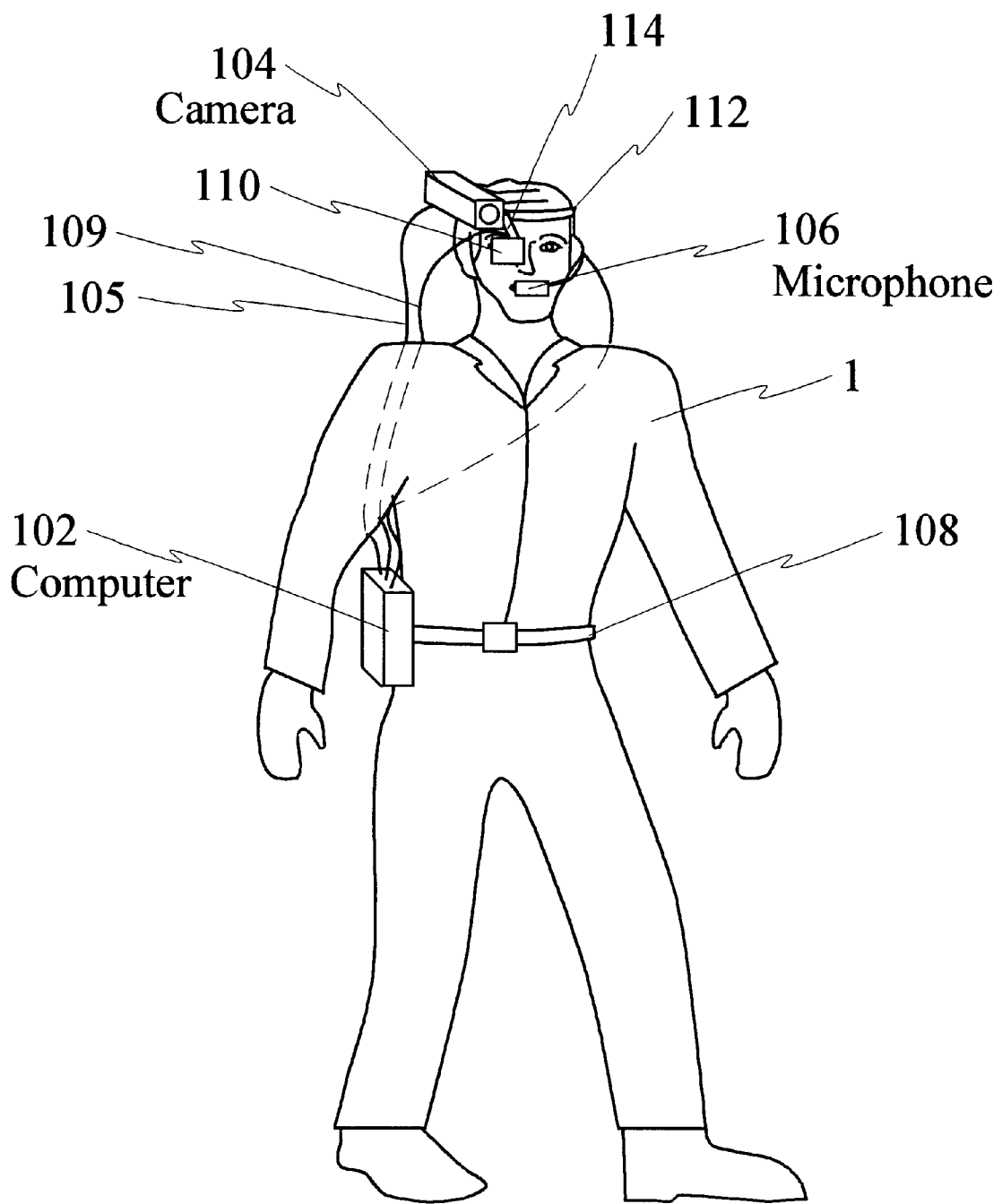
FIG. 2 is a side view of a user wearing the system of FIG. 1.

Referring to FIGS. 1 and 2, an operator or user 1 of a system according to the invention is shown. The user 1 is wearing a compact, portable computer 102, a portable camera 104 in the form of an analogue video camera, and an audio transducer means 106 in the form of a microphone. The mounting apparatus and locations for the computer 102, the camera 104, and the transducer means 106 are representational only and may vary in dependence upon application and personal comfort of the user 1. The computer 102 includes a securing means 108 in the form of a strap worn around the user's waist for securing the computer 102 to the user.

Optionally, the computer 102 is connected to a display means for displaying information from the computer 102. The display means comprises a headband 112, a display screen 110 and an adjustable arm 114 connecting the display to the headband 112 and allowing the user to comfortably view information displayed on the display screen 10 during operation of the system. The display screen 110 is electrically coupled to the computer 102 via a cable 109.

The headband 112 supports the camera 104 via an adjustable mount. In the present embodiment, the camera 104 is electrically connected to the computer 102 via a cable 105. The connection between the computer 102 and the camera 104 is used to send commands from the computer 102 to the camera 104, the commands including a command to capture an image, a command to send a representation of an image to the computer 102 via the cable 105, commands to zoom camera lens, commands to alter the focus of the camera lens, and commands to change aperture settings of the camera lens.

The transducer 106 in the form of a microphone is electrically connected to the computer 102. Audible tones present at the transducer 106 are converted into electrical signals and provided to the computer 102. The provision of electrical signals from a transducer to a computer is well known in the art. The computer 102 includes an audio signal converter means for converting the electrical signal received from the transducer 106 into digital electrical signals. The computer 102 comprises a means for recognising the digital electrical signals, and for sending the recognised signals to a processor within the computer 102.

In a preferred embodiment, the camera provides a digital output to a port on the computer 102 from which it is provided to the processor. Alternatively, the computer 102 includes an image converter means by which images received via the camera cable from the camera 104 are converted to a digital electrical signal, and a means for providing the converted electrical signals to a processor within the computer 102.

The computer includes a means for storage of the audio signals and the representations of images in the form of volatile or non-volatile memory. The computer also includes means with which to transfer data to and from other computers in the form of an electrical cable connected between the computer 102 and a second computer (not shown), allowing data to be transferred between the two computers. The electrical cable connects the two computers using either a serial port or a parallel port.

In the preferred embodiment, the computer 102, the optional display 110, the transducer 106, and the camera 104 are adapted to be completely supported by the user 1. During use, the optional display 110 is located permitting the user 1 to accomplish other tasks, i.e. servicing a device, while glancing at the screen 110 for information regarding the task. The transducer 106 provides verbal control of the computer or verbal information entry; this maintains a hands-free mode of system operation for unimpaired performance of manual tasks. The system supports verbal commands for controlling the camera 104 in the form of image acquisition commands, lens adjustment commands, and other commands relating to image review and processing. In use, the user 1 records prose in the form of voice commentary and images regarding the task performed and the system associates the recorded images and the prose in the form of recorded voice commentary. The association is performed in dependence upon a predetermined set of criteria. Examples of some criteria include chronology, user commands, and labels. Preferably the computer 102 is used to record prose in the form of a voice commentary and to command the camera 104 to capture images allowing voice, and image data to be stored in a digital format. Digital storage facilitates digital transmission of the recorded information using a digital communications means such as the internet. The association between prose and recorded images are stored as image identifiers. These identifiers comprise image information and a location within the prose where the identified image is to be inserted.

Figure 3:
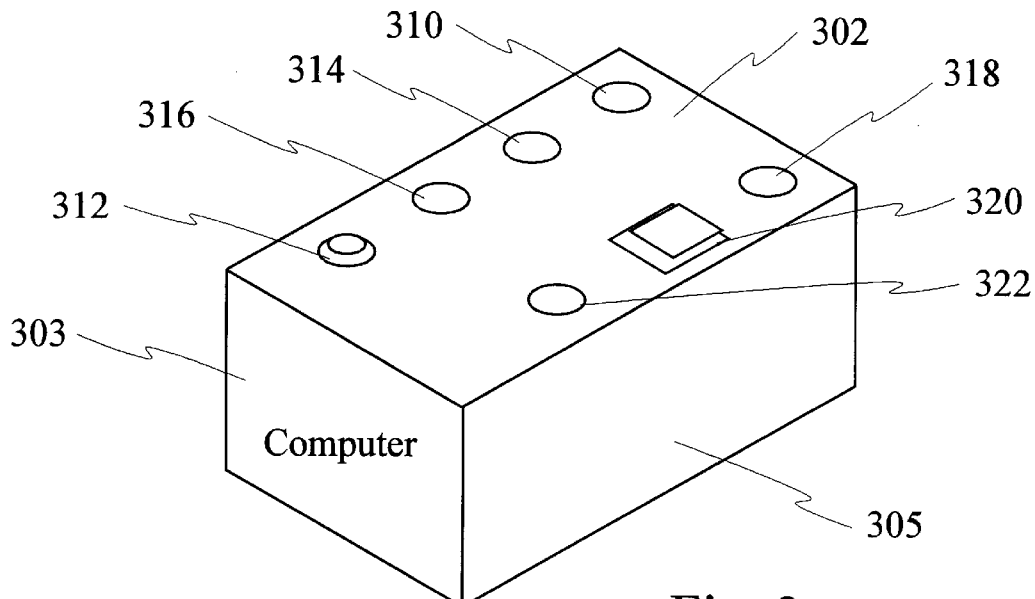
FIG. 3 is a perceptive view of a computer for use in the system according to the invention.
Figure 4:
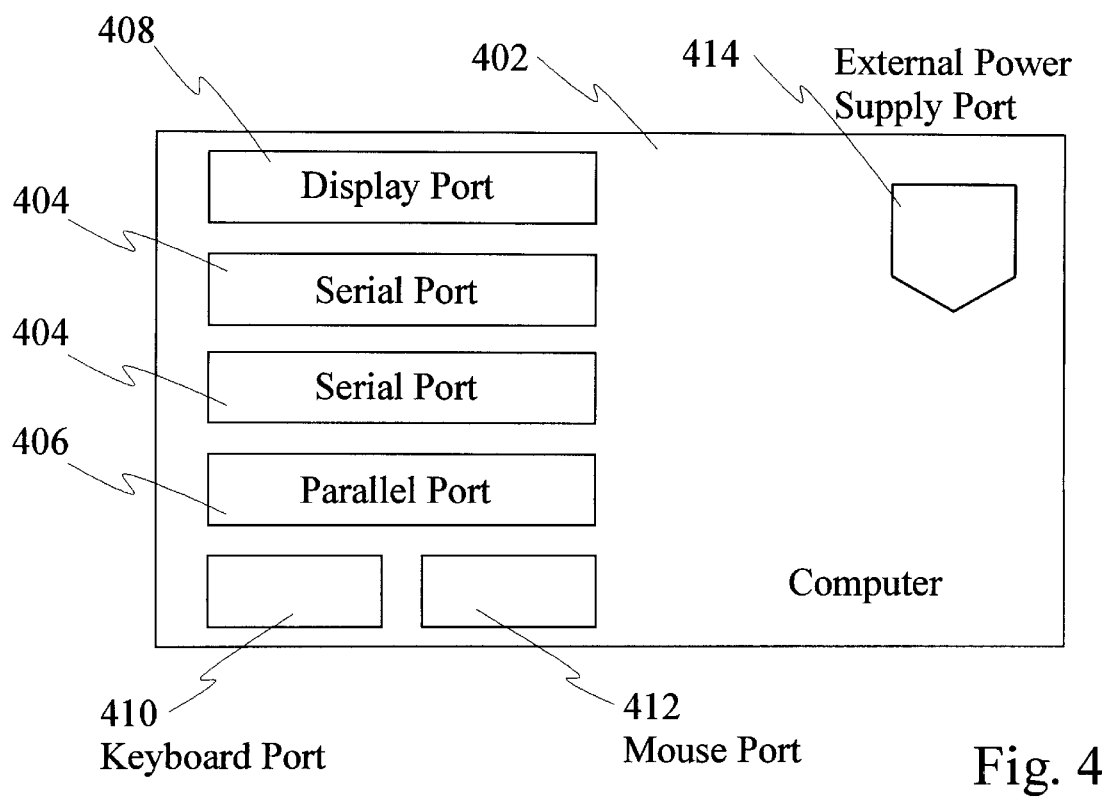
FIG. 4 is a bottom plan view of the computer.
Figure 5:
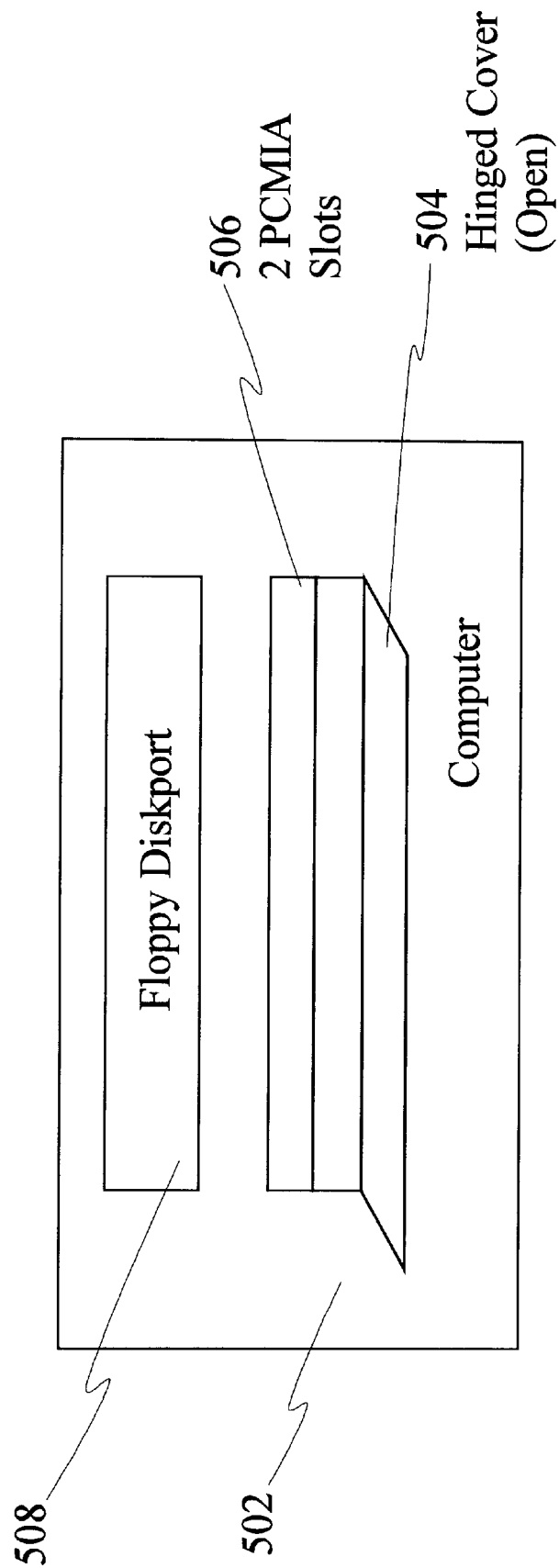
FIG. 5 is a left side view of the computer.

FIGS. 3, 4, and 5 are exterior views of the computer 102. The computer 102 is lightweight and of a small size; in an embodiment, the computer is 250 mm by 200 mm by 60 mm and weighs approximately 1.5 kg. These dimensions and weight are merely demonstrative and, other weights and dimensions are also within the scope of the present invention. The computer 102 includes a top panel 302, a bottom panel 402, a front panel 303, a back panel (not shown), a right side panel 305, and a second side panel 502. Connected to the back panel (not shown) is a clip which is used to connect the computer to the strap or belt 108. Located on the top panel 302 are a transducer jack 310 in the form of an industry standard microphone jack, a video input jack 316 in the form of an industry standard video jack, and a speaker jack 314 in the form of an industry standard speaker output jack. A transducer 106 is connected to the computer 102 via the microphone jack 310. In a preferred embodiment, a microphone/speaker assembly having both a transducer to receive audio signals and a speaker is used in place of a separate transducer 106 and speaker; optionally, this is accomplished using only a single microphone/speaker jack. Also on the top panel 302 is a volume control 312, preferably a knob or a button, which controls the volume level of the audio output from the speaker jack 314. Optionally, the volume control 312 allows control of audio input volume. When the camera 104 is an analogue video camera, it is coupled to the computer 102 via the video input jack 316. When the camera is a digital camera or a digital video camera, it is coupled to the computer through a serial port 404, a parallel port 406 or a dedicated video port 316. Alternatively, the computer 102 incorporates a single analogue/digital video port for detecting analogue or digital video information and converting same into digital image information for use by the computer 102.

Referring to FIG. 3, located on the top panel are a voice input indicator 318 in the form of a light-emitting-diode (LED) for providing visual feedback when the transducer 106 receives verbal input from the user 1. A power on/off switch 320 provides power to the computer in a first "on" state and limits power to essential circuits in a second "off" state. Power on/off switches are well known in the art. A power indicator 322 in the form of an LED provides visual confirmation when the power on/off switch 320 is in the first "on" state.

The bottom panel 402, shown in FIG. 4, includes a monitor or display port 408, two serial ports 404, a parallel port 406, a keyboard port 410, a mouse port 412, and an external power supply port 414. Preferably, the serial ports 404 are both RS-232 compatible serial ports and the parallel port 406 is a Centronics compatible parallel port. When the camera 104 interfaces to the serial port 404, the camera cable 105 is connected between the serial port 404 and the camera 104.

In an embodiment, the side panel 502 comprises a hinged cover 504 for opening and closing. When the hinged cover is open, card slots 506 are accessible for insertion of expansion cards. In an embodiment, the expansion slots are PCMCIA compatible. Expansion cards enhance the capabilities of the computer 102. Some examples of expansion cards are fax cards, fax modem cards, processor cards, wireless communications cards, memory cards, Ethernet cards, or hard-disk storage cards. In an embodiment, one of the card slots 506 is occupied by a speech to text card in the form of an IBM Voice Type Dictation® PCMCIA card for converting electrical signals from the transducer 106 into text. In the embodiment, the side panel 502 also includes a port 508 for connecting an optional floppy disk drive. Optionally, the computer 102 includes different ports and connectors from those described above without diverging from the spirit and intent of the present invention.

In an embodiment, the computer 102 is an IBM® compatible personal computer. A computer motherboard suitable for this embodiment includes a processor, RAM memory, a hard disk controller, a floppy disk controller, two RS-232 serial ports, a parallel port, a keyboard port, and a PC-104 expansion bus and is manufactured by WinSystems® Inc. The processor is an Intel® 80486-DX4 manufactured by Intel® Corporation. Alternatively, another processor having sufficient processing power is used. Preferably, the mother board has at least 16 megabytes of RAM. A PCMCIA expansion board that holds two PCMCIA cards is connected to the motherboard via the PC-104 expansion bus. Optionally, a video board is installed in the PC-104 expansion bus to support a display. The video board is a super VGA standard video board. Alternatively, another video standard or a proprietary video system is used. - - - An IBM VoiceType Dictation® PCMCIA Adapter card is plugged into the PCMCIA expansion board.

In an alternative embodiment, the computer is a portable computer in the form of a lap top computer, or a portable computer where the multiple elements of the computer such as the processor, the memory, and the power supply are not contained in a single enclosure but are contained in several distinct enclosures coupled together and supported at distributed locations on the body of the user 1. Alternatively, the computer 102 and the camera 104 are contained in a single enclosure.

In the present embodiment, the input hardware comprises a microphone jack 310, the video input jack 316, a frame grabber when an analogue video signal is provided to the computer from the camera 104 or, alternatively, a serial port 404 or parallel port 406 when the camera 104 interfaces to the computer through one of these standard interfaces. A preferred speech to text means comprises an IBM Voice Type® PCMCIA adapter and associated software. The IBM Voice Type® PCMCIA adapter and associated software supports non-continuous speech trained speech to text with a 20,000 word vocabulary. Different speech to text means supporting, for example, speaker dependent or speaker independent continuous speech with large vocabularies are well suited to use within the invention.

The foregoing paragraphs describe an embodiment of a hardware portion of a system according to the present invention. Operation of the embodiment of the system according to a method of the invention is described below with reference to FIGS. 6 through 13.

Figure 6:
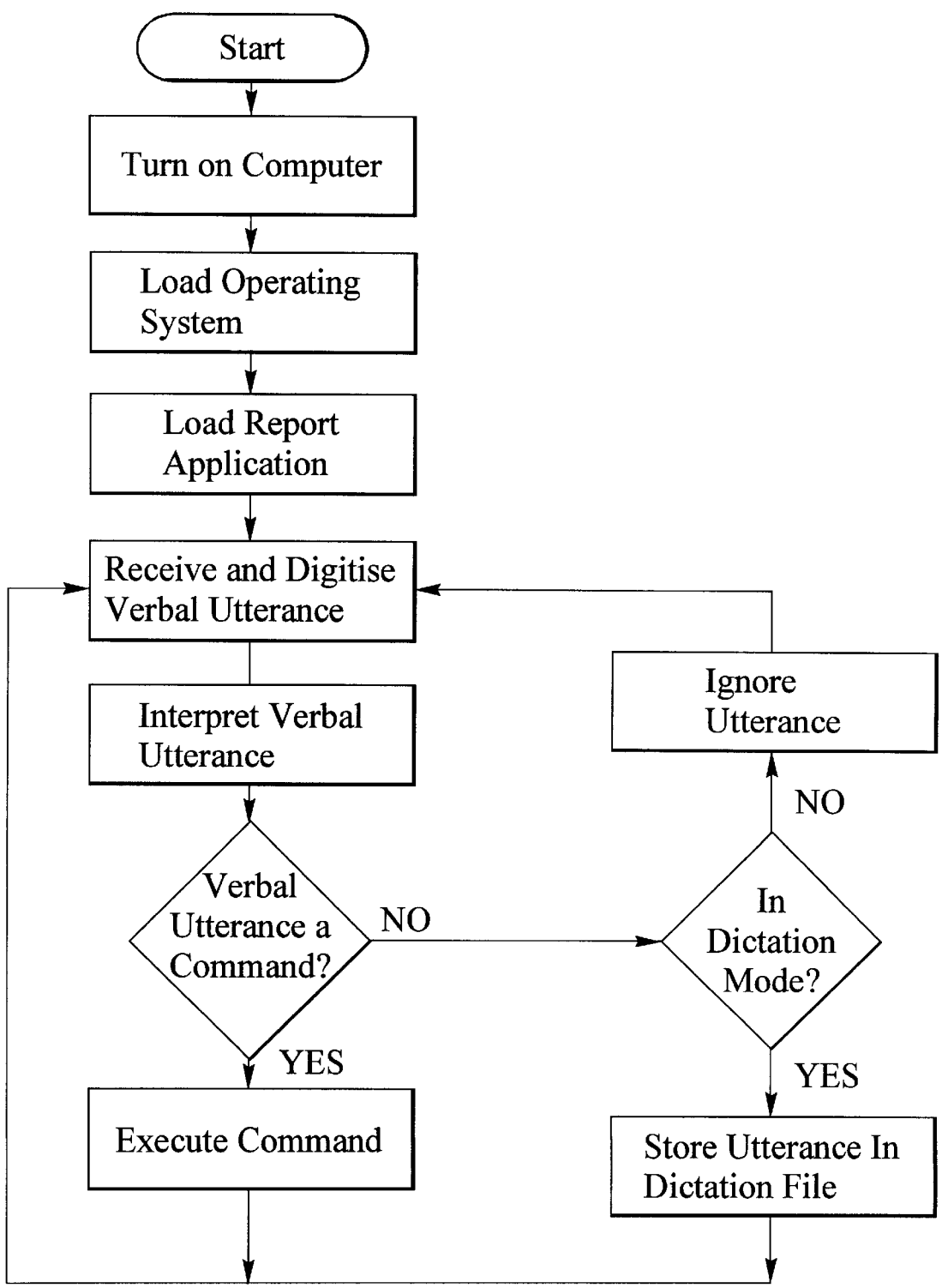
FIG. 6 is a simplified flow diagram of a method according to the invention wherein the system incorporates means for recording voice input and interpreting voice commands.

Referring to FIG. 6, a simplified flow diagram of a method according to the invention is shown. Upon actuation of the power on/off switch 320, the system is in a first "on" state. An operating system is loaded and execution of an application program in accordance with the invention is actuated. Once the application program is loaded and in execution, the system awaits signals provided by the transducer 106.

When signals from the transducer 106 are received by the computer 102, a speech to text means, also referred to as a voice recognition means, within the computer 102 converts the signals to digital signals. The speech to text means attempts to interpret the digital signals as prose in the form of words, expressions, descriptions, etc. or commands.

Voice recognition or "speech to text" means are generally known in the art. One such system is disclosed in U.S. Pat. No. 5,231,670 to Goldhor, et al. Entitled "Voice Controlled System and Method for Generating Text from a Voice Controlled Input." Voice recognition systems of this type are disclosed in U.S. Pat. No. 4,914,704 to Cole, et al. and U.S. Pat. No. 5,517,558 to Schalk. A number of publications on the topic of voice recognition have been published. Each publication set out below is incorporated herein by reference:

Tsuruta et al., "DP-100 Connected Speech Recognition System", Intelcon 79: Exposition Proceedings, Feb. 26–Mar. 2, 1979, pp. 48–52;

Martin, "One Way to Talk to Computers", IEEE Spectrum, May 1977, pp. 35–39;

Communications of the ACM, vol. 23, No. 12, December 1980, pp. 676–687, ACM, N.Y., U.S.A., J. L. Peterson, "Computer Programs for Detecting & Correcting";

Patent Abstracts of Japan, vol. 8, No. 89 (P-270) (1526), Apr. 24, 1984; & JP-A-59 3629 (Fujitsu K. K.) Oct. 1, 1984;

Patent Abstracts of Japan, vol. 5, No. 185 (P-91) (857), Nov. 25, 1981; & JP-A-56 114 041 (Tokyo Shibaura Denki K. K.) Aug. 9, 1981;

IEEE Trans on Information Theory, vol. IT-21, No. 3, May, 1975, pp. 250–256, "Design of a Linguistic Statistical Decoder for the Recognition of Continuous Speech", by F. Jelinek, L. R. Bahl, & R. L. Mercer;

ICASSP International Conf., Boston, April 1983, pp. 1065–1067, "Recognition of Isolated-Word Sentences from a 5000-Word Vocabulary Office Correspondence Task", by L. Bahl et al;

Rosenberg, et al.: Sub-Word Unit Talker Verification Using Hidden Markov Models, 1990 Intl. Conference of Acoustics, Speed & Signal Processing (IEEE), pp. 269–272, 1990;

Bennani, et al.: A Connectionist Approach for Automatic Speaker Identification, 1990 Intl. Conference of Acoustics, Speech & Signal Processing (IEEE), pp. 265–268, 1990;

Oglesby, et al.: Optimisation of Neural Models for Speaker Identification, 1990 Intl. Conference of Acoustics, Speech & Signal Processing (IEEE), pp. 261–264, 1990;

Rose, et al: Robust Speaker Identification in Noisy Environments Using Voice Adaptive Speaker Models 1991 Intl. Conference of Acoustics, Speech & Signal Processing (IEEE), pp. 401–404, 1991;

Perdue, et al.: CONVERSANT.RTM. Voice System: Architecture and Applications, AT&T Technical Journal, vol. 65, No. 5, pp. 34–47, September/October 1986; and, "Speaker Authentication and Voice Data Entry", Bruno-Beek et al., Conference: 21st Midwest Symposium on Circuits and Systems, Ames, Iowa, Aug. 14–15, 1978, pp. 266–273.

When the digital signals correspond to a command, the system executes the command. Examples of commands and their execution are set out below. When the signal is not a command and the computer is in "dictation mode," processed prose in the form of text corresponding to the digital signals is stored in a file. "Dictation mode" is better described below. The computer 102 then awaits further signals from the transducer 106.

Figure 7:
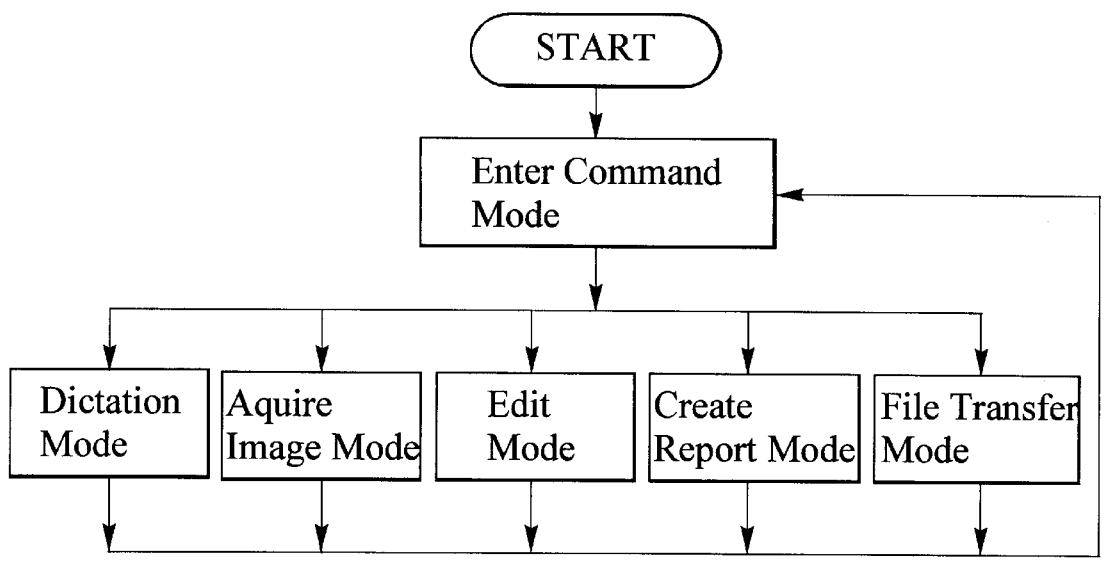
FIG. 7 is a simplified flow diagram of a high level method of organising an electronic implementation of a method according to the invention.

Referring to FIG. 7, a simplified flow diagram of flow between blocks or modes is shown. Initially, operation is within a command mode. Preferably, this is accomplished in dependence upon a speech to text means. Commands, execution for which are shown in FIG. 7, are mode change commands. In an embodiment, all modes are accessible from a single command mode and, from every other mode, command mode is accessible. Other modes are shown in the diagram and described below.

Figure 8:
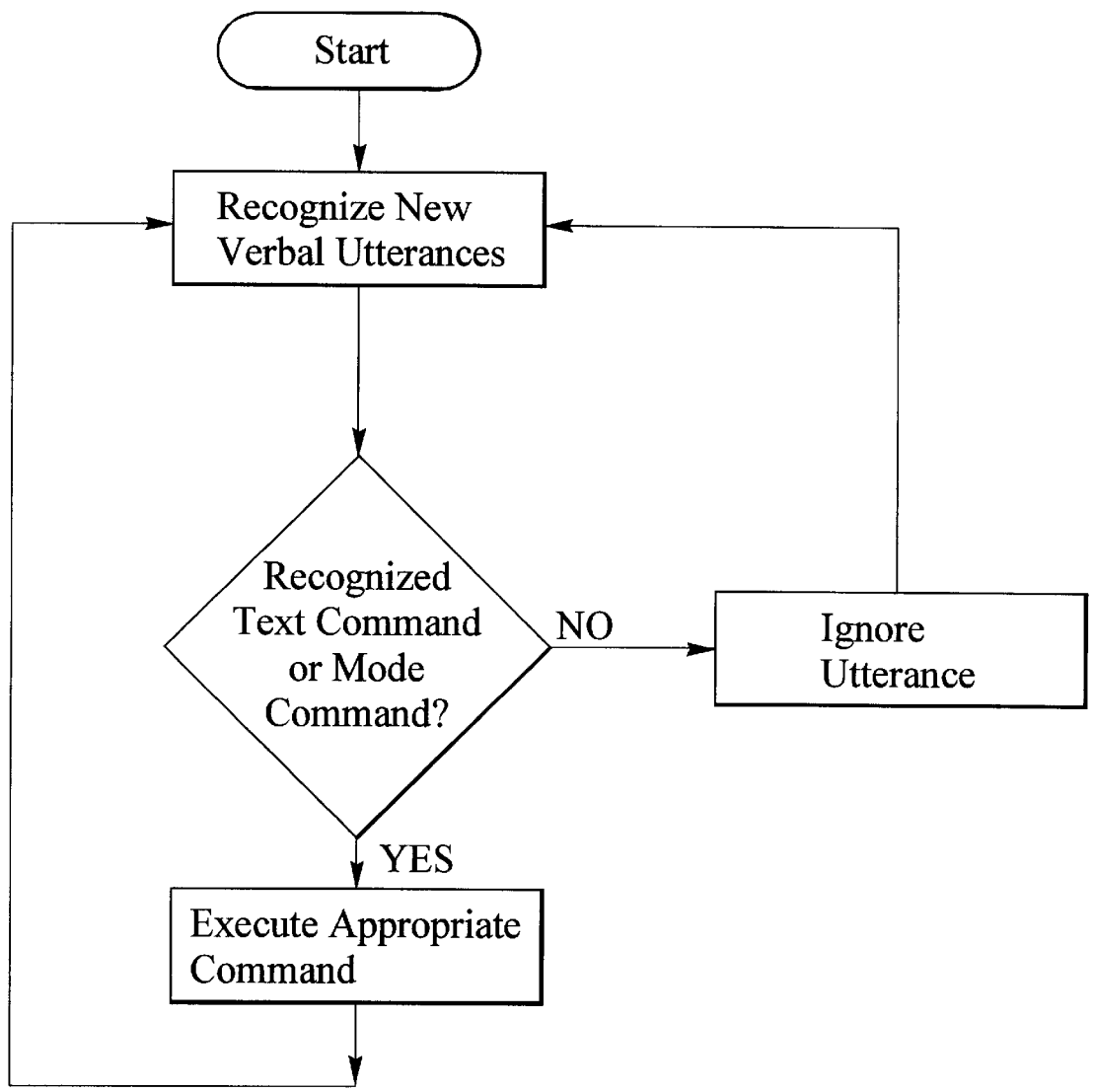
FIG. 8 is a simplified flow diagram of a command mode implementation for a method according to the invention.

FIG. 8 shows a simplified flow diagram of system operation while in command mode. In command mode, the user 1 speaks into the transducer 106 in the form of a microphone. The signal from the transducer 106 is provided to the computer 102 where a speech to text means converts the signal into text. The text is then compared with known commands. When the text does not correspond to a command for execution during command mode, the text and signal are ignored.

Commands for execution in command mode include a command to enter dictation, a command to acquire an image or sequence of images, a command to create a report, and a command to edit recorded information. However, these commands are exemplary and other additional commands may be employed. In a preferred implementation, the command mode also recognises commands for performing various functions that control operation of the computer 102. Optionally these include store file, erase file, shut down computer, list files, and search. Speech to text systems for enabling voice control of computers are well known in the art. After a command has executed, further signals provided to the computer 102 from the transducer 106 are converted to text and compared against known commands.

Figure 9:
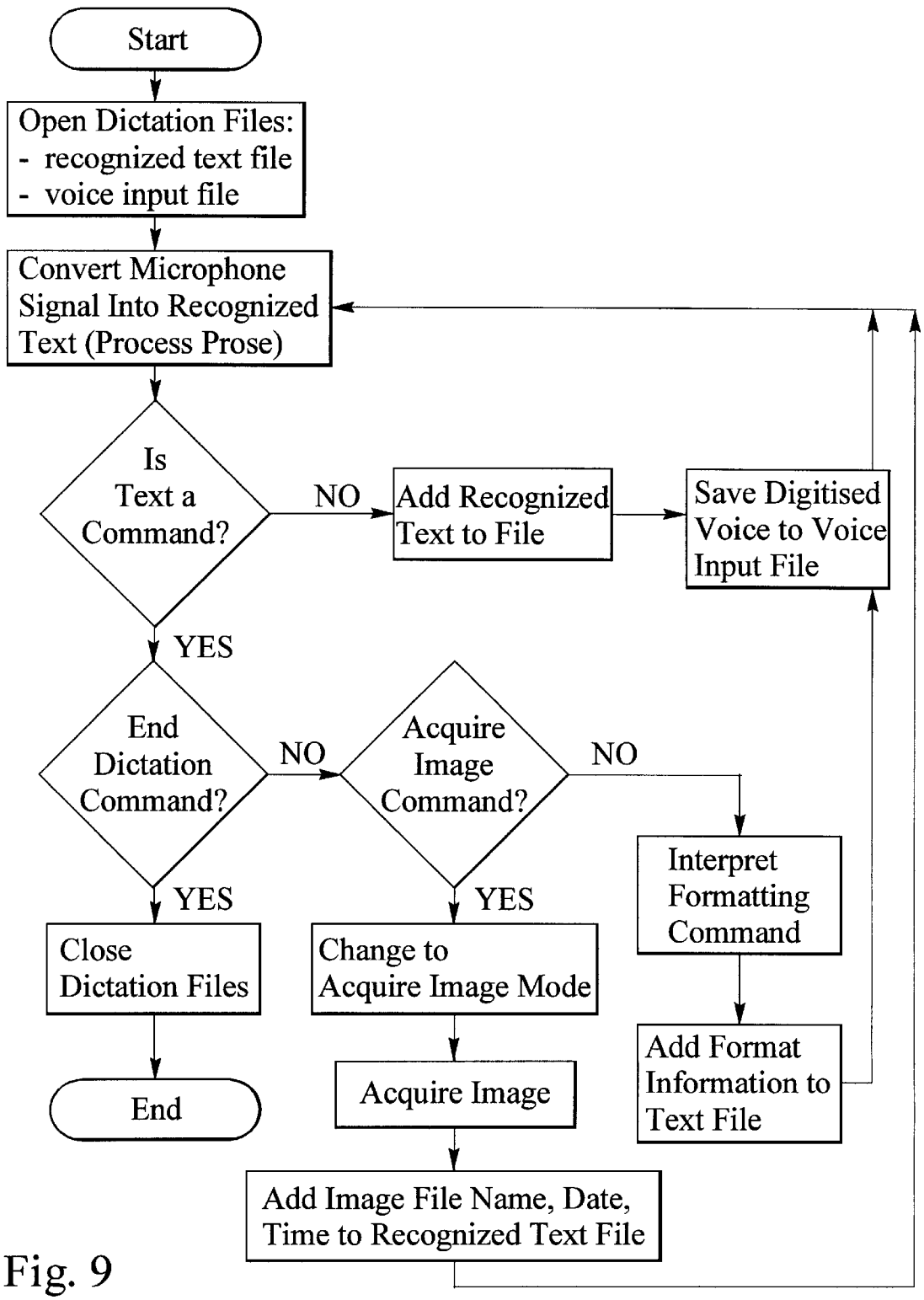
FIG. 9 is a simplified flow diagram of a dictation mode implementation for a method according to the invention.

Referring to FIG. 9, a simplified flow diagram of system operation during dictation mode is shown. When dictation mode is initiated, the user 1 is prompted to create new dictation files or to append the dictation to existing dictation files. When the user selects create new dictation files, two files are created and opened for accepting information. The first file stores digitised voice signals provided from the transducer 106. The second file stores text provided from the speech to text means. When the user selects to append new dictation to existing dictation files, the user is prompted to specify files to open. The files are opened for accepting information. The processor then awaits signals provided by the transducer 106. Alternatively, the processor awaits text from a speech to text means. When the text does not correspond to a command for execution during dictation mode, the text and the digitised voice signal are added to the files. When the text corresponds to a command for execution during dictation mode, the corresponding command is executed. Once the text has been processed, further text is processed until a command is recognised to end the dictation mode.

Examples of commands for execution during dictation mode are formatting commands, a command to end dictation mode, and a command to acquire an image. When the command is a formatting command, the command is interpreted and the formatting information is stored within the text file or another file or is executed on existing data within the text file. Examples of formatting commands include text formatting commands such as specifying bold type, italics, underline, type face, type size, etc.; paragraph formatting commands such as specifying indents, tab stops, line spacing, justification, widow/orphan control, etc.; insertion formatting commands in the form of commands for specifying justification of inserts, text flow about inserts, insert borders, insert captions, caption locations, cropping, etc.; document formatting commands in the form of commands for specifying page size, layout style, margins, page numbers, etc.; storage format commands in the form of commands for specifying file type, file locations, file compatibility, etc.; and security commands by way of example, password protection commands, encryption commands, compression commands, etc.

In one embodiment, formatting commands are commands that affect the format of text integrated into a report. Examples of specific formatting commands include commands to specify what type of report or database to create using a text file, a voice input file, and acquired image files, a command to start a new paragraph, and commands to add punctuation. Optionally, formatting commands may include commands to designate a paragraph as a figure caption for association with an acquired image, commands to wrap text around images, commands to enable selective placement of images within a report, commands to integrate voice, images, video and text into a multimedia report, or commands to overlay text onto images.

When dictation mode ends, the program returns to the command mode (Shown in FIG. 8). When the command is a command to acquire an image, acquire image mode is initiated, an image is acquired, the image is saved to a file, and dictation mode is resumed. Upon resuming dictation mode, the image identifier in the form of a filename and a date and time the image was acquired are added to the text file.

Figure 10:
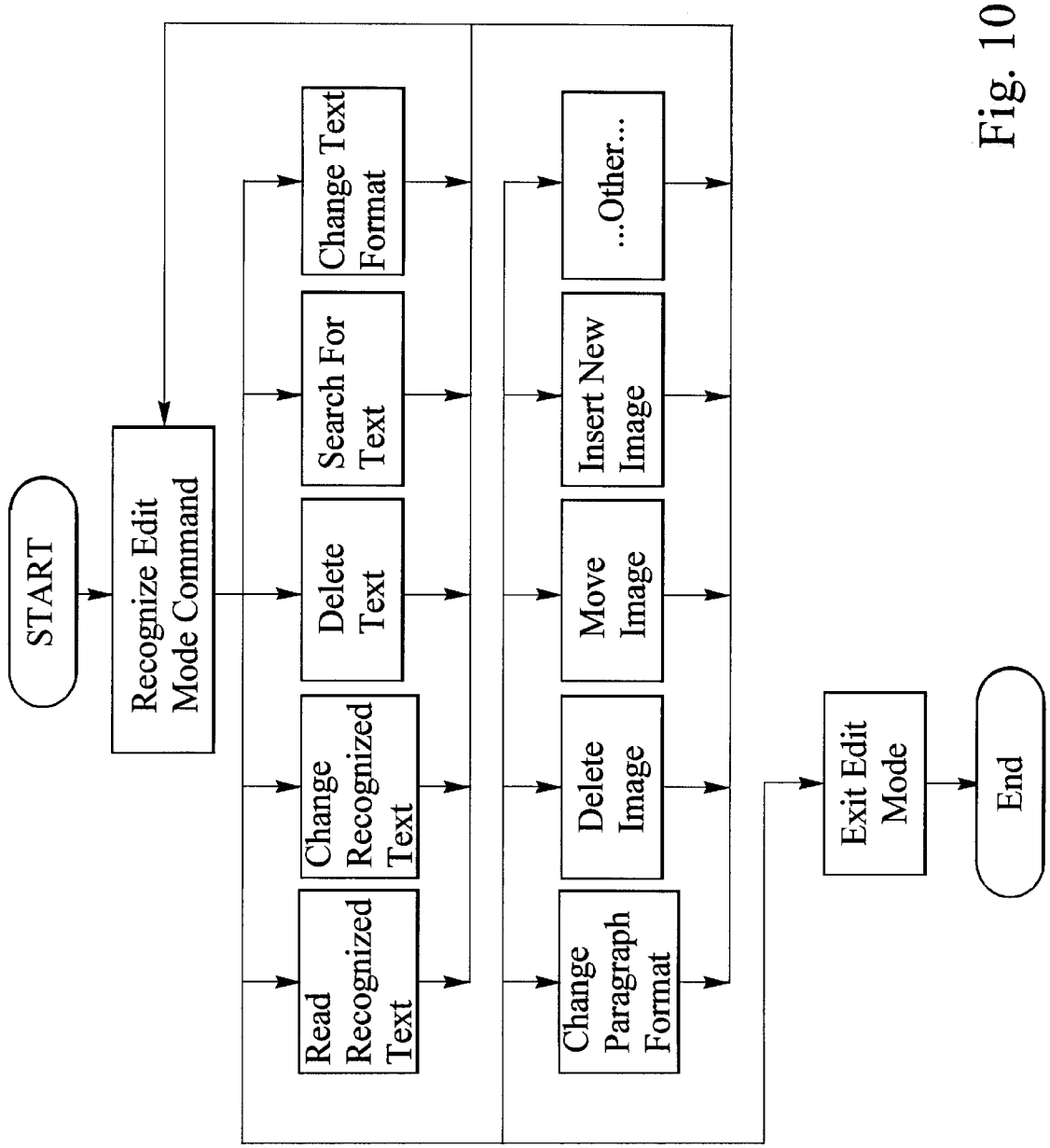
FIG. 10 is a simplified flow diagram of an edit mode implementation for a method according to the invention.

Referring to FIG. 10, a simplified flow diagram of an implementation of edit mode is shown. Edit mode supports commands to the computer 102 for reviewing sections of recorded data. Examples of edit mode commands include commands for moving within recorded data; commands for searching for data within the recorded data; commands for altering formatting of recorded data; commands for erasing recorded data in the form of text, digitised voice, or images; commands for moving an acquired image within a report; and commands for acquiring new data for insertion within a report at a specific location.

Figure 11:
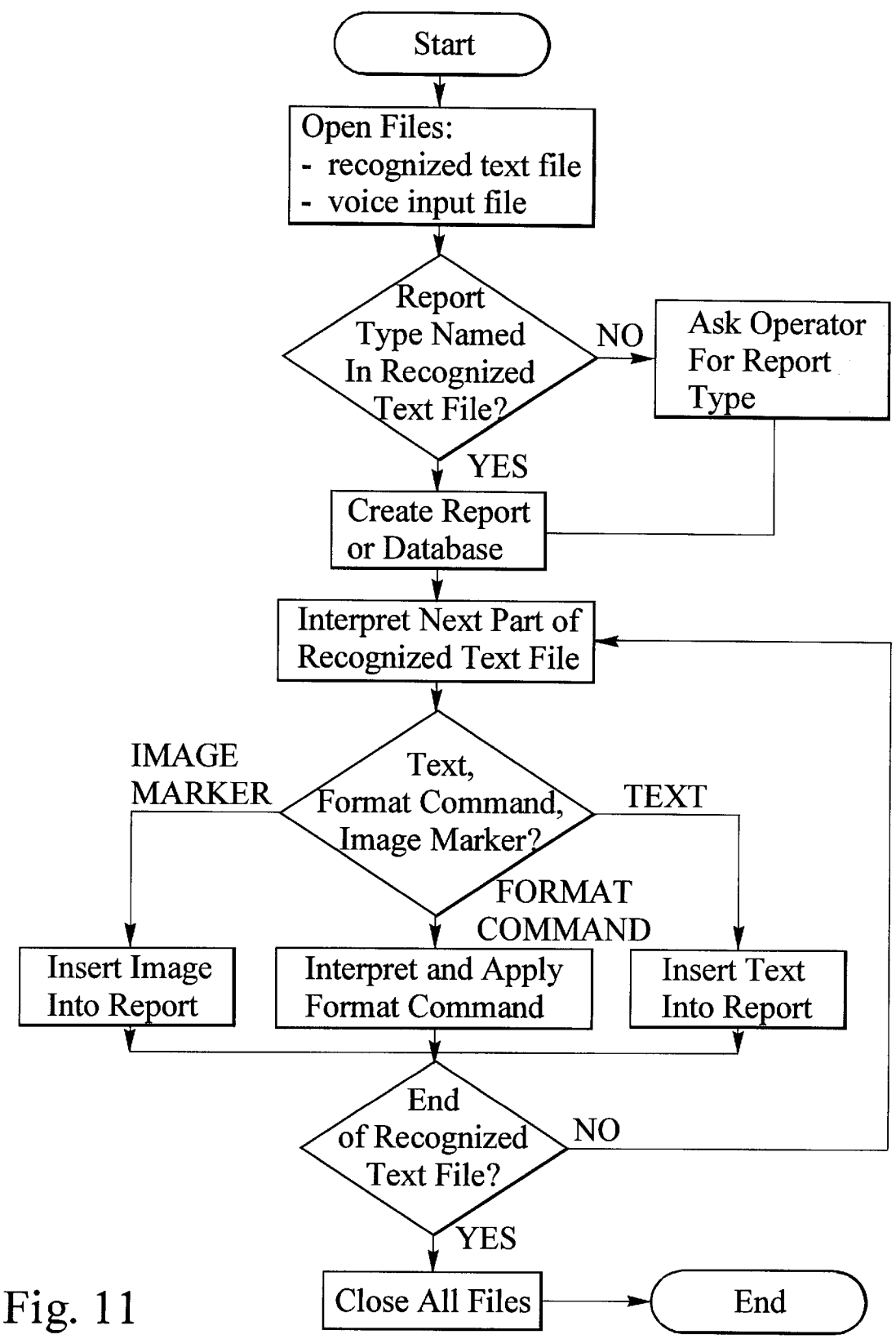
FIG. 11 is a simplified flow diagram of a create report mode implementation for a method according to the invention.
Figure 13:
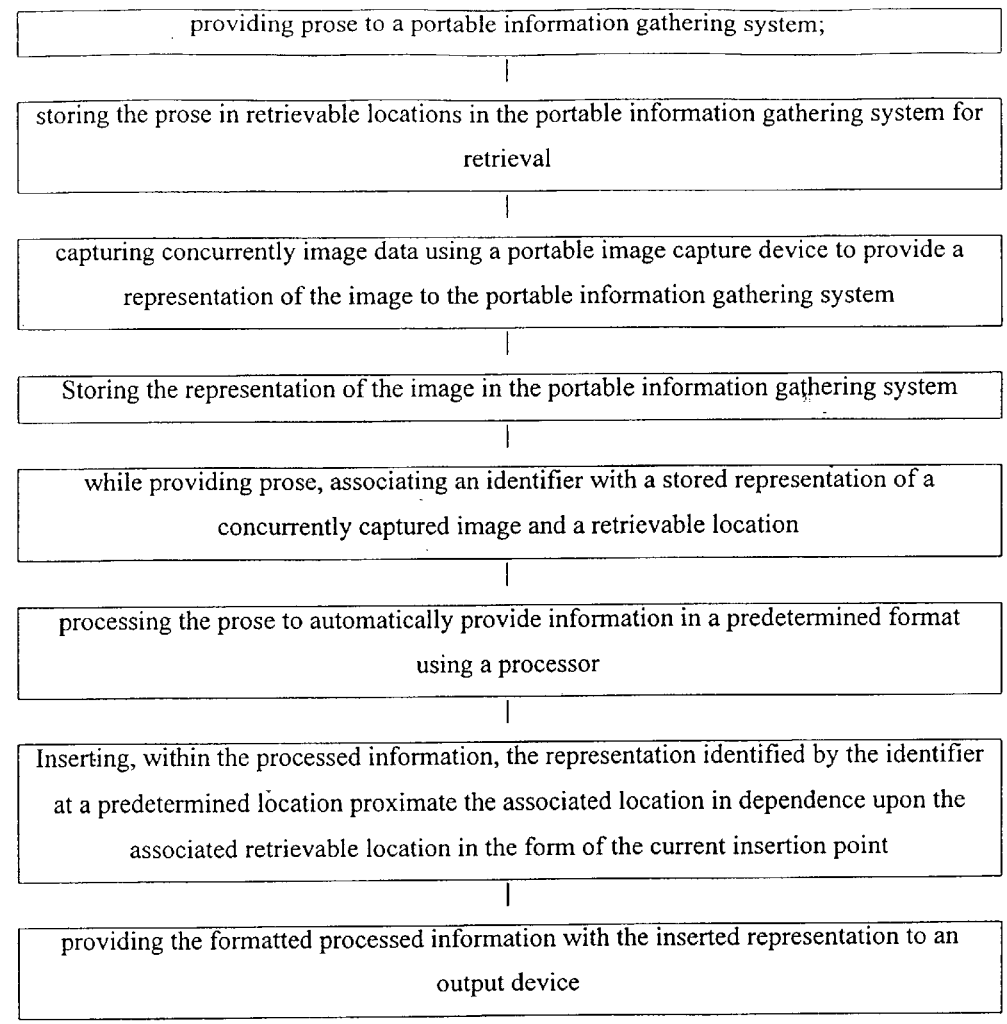

Referring to FIG. 11, a simplified flow diagram of an implementation of create report mode is shown. Within report creation mode, data recorded during other modes are integrated to form a report file or a database file. The user selects a report style or database file format. When no selection is made, a default style or file format is used. Optionally, a style or file format are specified within the recorded data overriding the selected style or file format. Examples of reports or databases for generation include word processing documents, computer based slide presentation files in the form of Microsoft PowerPoint® compatible files, hyper-text mark-up language (HTML) files for use as world wide web pages, or database files. In order to create a report or a database file, the processor parses recorded information for formatting information and for image insertion locations. Parsing of the text file commences at the beginning of the text file. Each word and symbol in the text file is parsed and acted on accordingly. When the parsed text is a formatting command, the command is executed. When it is processed prose, the text is inserted into the report or database file. When the text is an image identifier, the image specified by the image identifier is inserted into the report or database file. Optionally, once the report or database generation is complete, the report file or the database file is edited using an appropriate software application.

Figure 12:
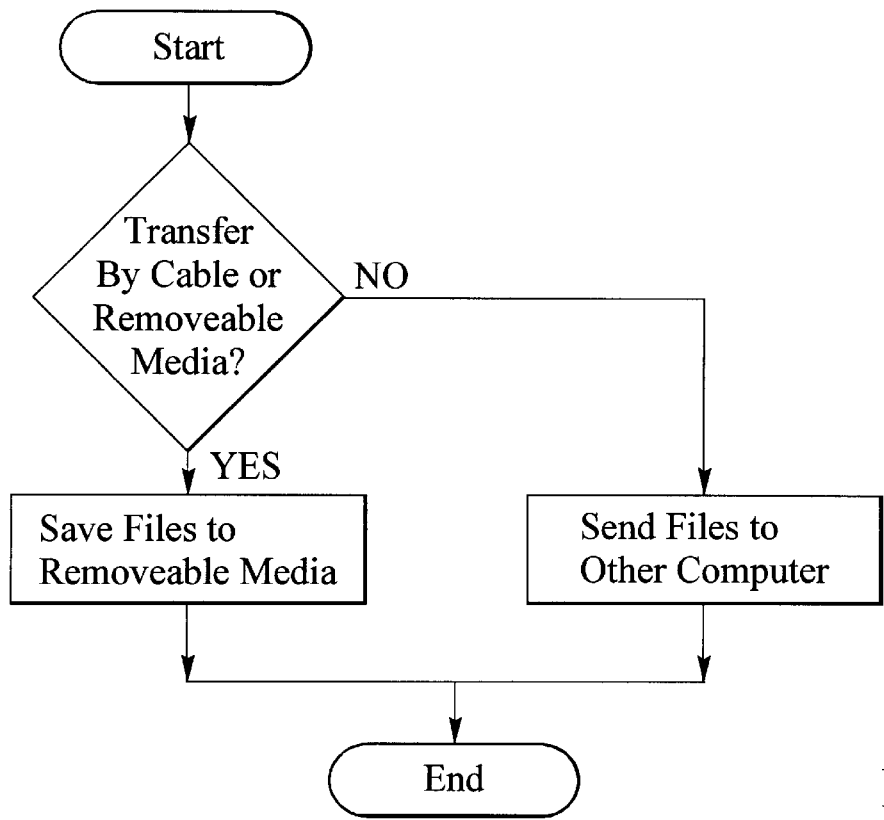
FIG. 12 is a simplified flow diagram of a file transfer mode implementation for a method according to the invention; and, FIG. 13 is a simplified flow diagram of the invention.

Referring to FIG. 12, a simplified flow diagram of an implementation of file transfer mode is shown. Methods of file transfer between computers are well known to those of skill in the art. An embodiment is shown in flow diagram, but any suitable method of file transfer may be employed.

In an alternative embodiment, the computer is a desktop computer. In this embodiment, it is inconvenient for the user 1 to carry the desktop computer during data gathering. Therefore, data gathering is performed using a video camera or audio recording means and a digital camera. The processing of the gathered information and commands including execution of the commands and recognition of prose in the form of dictation is performed at a time subsequent to recording the gathered information. When a video camera is used, the voice and image data is chronologically synchronised. Preferably, when an audio recorder and a digital still image camera are used, capturing an image with the still camera is associated with a specific location in the audio recording. Optionally, this is accomplished by indicating in speech that an image is being captured, providing an association between prose and captured images via a coupling of the audio and image capture means, through recording of a sound associated with image acquisition in the form of a shutter click or other audible feedback, or through other known means. It will be recognised by those of skill in the art that digital cameras do not all provide audible feedback. In an embodiment, the association is a time stamp aligning the recording times of the voice and image recordings.

Recorded voice information and recorded images are stored in non-volatile storage in an analogue or digital format for later retrieval. During report generation, the recorded information is provided to a processor for speech to text conversion, command interpretation, and report construction according to the invention. In the embodiment using a video camera wherein the camera is mounted on an inspectors head or shoulder, a report or inspection is conducted during which the video camera records the entire inspection including voice and image information. The recorded information is provided to a computer system wherein the voice is digitised. The digitised voice is converted to text by a speech to text means and parsed for commands. When an image capture command is parsed, a video image provided to the computer and synchronised with the audio command is digitised and stored. This embodiment facilitates implementation of the invention requiring a plurality of video cameras for a plurality of reporters or inspectors, but only requiring a single processor at a predetermined location for accepting the video information and automatically generating reports therefrom.

In another embodiment, image acquisition is initiated through a manual control. The control results in capture of an image or a series of images and in storage of image identifiers in the form of time stamps for placing the captured images within a report. The image identifiers are described as identifying an image and a location within the processed prose where the image is to be inserted. It is apparent to those of skill in the art that video clips, audio clips, tables, reports, database entries, etc. are inserted using identifiers. Identifiers comprise data necessary for retrieving and inserting the information. The necessary data comprises a source for the identified item for insertion, a location where the item is to be inserted and format information for the item. When the insertion location is a current text insertion point, the location of the identifier forms part of the identifier data. Likewise, when the identifier is located within image files or image filenames, the location forms part of the identifier data. Default data is employed when some of the identifier data is omitted from an identifier.

Optionally, the image identifiers are stored within the prose at or proximate a location where the images are to be inserted; within images and comprise information relating to prose and prose locations for inserting the images; or in various locations and comprise information in the form of image indexing information, image caption information, image name, image reference, image insertion location, image category, and so forth. In this fashion, an image, of for example a poorly installed window, when inserted into a report, can be accompanied by a reference image from previously stored information—in this example, a properly installed window.

It is apparent that once the prose is processed, recording the prose is unnecessary for report generation; however, in a preferred embodiment, the prose are recorded for reference and archival purposes. Similarly, it is only necessary to record images for insertion in a report. Preferably, other images are also recorded in dependence upon commands to increase editing flexibility. In an embodiment, the text and prose are added to the text file and stored together for retrieval, archiving, and editing. In another embodiment, one of the text and prose is recorded for later use. When only the prose is recorded for later use, the dictation mode is operated with the previously recorded prose; this is similar to the method described herein where a central processor is used to process gathered data and a plurality of video cameras are used to gather the data.

In the preferred embodiment, the digital signals are interpreted as text and commands. It is apparent to those of skill in the art that this is achievable through several methods such as processing the prose into text and processing the text to extract prose and commands; processing the prose to extract text and commands; processing the prose twice—once to extract prose and once to extract commands; and, processing the prose and providing commands through a second other input source.

According to the method of the present invention, any of a number of modes are capable of acting as the initial mode. The choice of an initial mode is a design decision.

According to the invention, a report format is selected by a user upon initiating report generation. The user selects a report style or database file format from known styles or formats. When no selection is made, a default report style or file format is used. Optionally, a style or file format are specified within the recorded data, overriding the selected style or file format.

In an alternative embodiment, the speech to text system extracts formatting and image location information from the gathered information and stores the extracted information in a separate file. The separate file acts as an instruction set for report generation. During report generation, the separate file is parsed and data is inserted into the report and formatted in accordance with formatting instructions contained within the separate file. The result is a pseudo command file that is parsed to construct the report. Such a command file may be a Word® macro, another "batch" type file, an executable or an interpretable file. Connections to points within the prose are maintained through index marks, flags, labels, or location indicators. These location indicators are preferably stored within the text; this allows for editing the text file without disturbing the location indicator locations. Alternatively, information relating to connections is maintained within the separate file. Using a separate file for formatting and image insertion information, allows gathering of information for a plurality of reports, simultaneously.

The choice to digitise specific images or every image is a design choice and both approaches are equally applicable to the method according to the present invention. Further, the file format for storing gathered data is a design choice. A single file or a plurality of data files are both suitable to the method of the invention.

Although the prose in the preferred embodiment comprise voice data entry, prose in other forms are also within the scope of the invention. Sign language data entry through visual recognition of signing, data entry via a keyboard, and other means of entering prose are capable of being integrated into an automatic report generation system according to the present invention.

The portable system for data gathering described comprises wires connecting components and used for information transfer. This is merely one option. Other communications means in the form of removable disks, Ethernet, modems, or infrared ports, or RF communications are also suitable to the present invention. In a preferred embodiment, data gathered and when possible processed by an inspector is transmitted to the office via electronic communications, thereby obviating the need to visit the office after each inspection.

Numerous other embodiments of the invention may be envisioned without departing from the scope of the invention.

What is claimed is:

1. A method of automatically generating a report performed by an electronic system in dependence upon captured information comprising the steps of providing prose to a portable information gathering system;

storing the prose in retrievable locations for retrieval;

capturing concurrently image data using a portable image capture device to provide a representation of the image to the portable information gathering system;

storing the representation of the image in the portable information gathering system;

while providing prose, associating an identifier with a stored representation and a retrievable location;

processing the prose to automatically provide information in a predetermined format using a processor;

automatically inserting, within the processed information, the representation identified by the identifier at a predetermined location in dependence upon the associated retrievable location;

and providing the formatted processed information with the inserted representation to an output device.

2. A method of automatically generating a report in dependence upon captured information as defined in claim 1 wherein the information in a predetermined format is text information.

3. A method of automatically generating a report in dependence upon captured information as defined in claim 2 wherein the information in a predetermined format comprises electronic text generated using a speech to text means.

4. A method of automatically generating a report in dependence upon captured information as defined in claim 3 wherein the representation of the image is recorded in response to a voice command.

5. A method of automatically generating a report in dependence upon captured information as defined in claim 1 wherein the predetermined location is proximate the associated location.

6. A method of automatically generating a report in dependence upon captured information as defined in claim 1 wherein the prose is provided as spoken voice information.

7. A method of automatically generating a report in dependence upon captured information as defined in claim 1 wherein the representation of the image is recorded in response to a voice command.

8. A method of automatically generating a report in dependence upon captured information as defined in claim 1 wherein a speech to text means converts spoken prose into alphanumeric text during information gathering and stores the alphanumeric text at a current insertion point within a file.

9. A method of automatically generating a report in dependence upon captured information as defined in claim 8 wherein the associated retrievable location is a current insertion point within the file.

10. A method of automatically generating a report in dependence upon captured information as defined in claim 1 wherein a speech to text means converts spoken prose into alphanumeric text after information gathering is completed.

11. A method of automatically generating a report performed by an electronic system in dependence upon captured information comprising the steps of: providing concurrently recorded information comprising audio recording information and image recording information to a processor;

using a speech to text means, automatically processing the audio recording information to extract commands and to extract information;

using a processor, automatically formatting the processed audio recording information and the image recording information in dependence upon extracted commands; and, providing the formatted processed information to an output device.

12. A method of automatically generating a report performed by an electronic system in dependence upon captured information comprising the steps of providing spoken prose to means for converting speech to text;

automatically converting the spoken prose to electronic text prose and storing the electronic text prose stored in retrievable locations for retrieval;

providing spoken commands to the means for converting speech to text;

converting the spoken commands to electronic commands;

in response to an electronic command, capturing image data concurrently with the spoken prose using a capture means and providing a representation of the image to a processor;

storing the representation of the image in non-volatile storage;

in response to an electronic command, associating a representation and a retrievable location within the electronic text prose and an identifier;

storing the identifier in non-volatile storage means;

using a processor, processing the electronic text prose and providing information in a predetermined format and providing commands;

automatically inserting, within the information in a predetermined format, the representation identified by the stored identifier at a predetermined location in dependence upon the associated retrievable location; and storing the formatted processed information with the inserted representation in nonvolatile memory.

* * * * *